US006534120B1

United States Patent
Ozawa et al.

(10) Patent No.: US 6,534,120 B1
(45) Date of Patent: Mar. 18, 2003

(54) CHEMICALLY REINFORCED GLASS MANUFACTURE METHOD, INFORMATION RECORDING MEDIUM GLASS SUBSTRATE MANUFACTURE METHOD, INFORMATION RECORDING MEDIUM MANUFACTURE METHOD, AND CHEMICAL REINFORCEMENT DEVICE

(75) Inventors: Jun Ozawa, Tokyo (JP); Shinji Eda, Tokyo (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 09/606,715

(22) Filed: Jun. 29, 2000

(30) Foreign Application Priority Data

Jun. 30, 1999 (JP) .......................................... 11-186094

(51) Int. Cl.[7] .............................. B05D 5/12; B05D 1/18; B05D 1/36
(52) U.S. Cl. ...................... 427/127; 427/402; 427/431; 427/432
(58) Field of Search ................................. 427/169, 127, 427/402, 431, 432; 65/30.1, 30.13

(56) References Cited

U.S. PATENT DOCUMENTS

| 3,879,274 A | * | 4/1975 | Matsumori et al. ......... 204/130 |
| 4,874,414 A | * | 10/1989 | Kaite et al. ................. 65/20.13 |
| 5,681,609 A | * | 10/1997 | Kitayama et al. ........... 427/129 |
| 6,119,483 A | * | 9/2000 | Takahashi et al. .......... 65/30.14 |

FOREIGN PATENT DOCUMENTS

JP    59-131543 A    *   7/1984

* cited by examiner

*Primary Examiner*—Michael Barr
(74) *Attorney, Agent, or Firm*—Cook, Alex, McFarron, Manzo, Cummings & Mehler, Ltd.

(57) ABSTRACT

In order to prevent particles generated in the preparation of a chemically reinforcing molten salt from getting into an operation atmosphere for performing a chemical reinforcement, a chemical reinforcement tank 2 and a dissolution tank 10 for preparing the chemically reinforcing molten salt are separated from each other. In a typical embodiment, the chemical reinforcement tank is disposed in a clean room 35, and the dissolution tank 10 is disposed outside the clean room.

18 Claims, 3 Drawing Sheets

CHEMICALLY REINFORCED GLASS MANUFACTURE METHOD, INFORMATION RECORDING MEDIUM GLASS SUBSTRATE MANUFACTURE METHOD, INFORMATION RECORDING MEDIUM MANUFACTURE METHOD, AND CHEMICAL REINFORCEMENT DEVICE

REFERENCE TO RELATED APPLICATION

This application claims the priority right under Paris Convention of Japanese Patent Application No. 186094/1999 filed on Jun. 30, 1999, the entire disclosure of which is incorporated herein by reference.

BACKGROUND OF THE INVENTION i) Field of the Invention

The present invention relates to a manufacture method of a chemically reinforced (chemical strengthening) glass having a high-quality surface and a chemical reinforcement device, particularly to a manufacture method of a glass for electric products such as an information processing apparatus.

ii) Description of Related Art

Chemically reinforced glasses are used, for example, in glass substrates for electric products, and above all, a glass substrate for an optical, magnetic, or optical magnetic information recording medium is representative. The chemically reinforced glass has been used for such purpose because the chemically reinforced glass is provided with high surface smoothness and much strength. However, with the enhancement of electronic product functions, the enhancement of surface quality of a chemically reinforced glass substrate has been increasingly and strongly demanded. Particularly, in the glass substrate for a magnetic recording medium, such demand is remarkable in order to sufficiently fulfill the original performance of a magnetic head.

It is demanded that in the magnetic recording medium, the surface is maintained to be flat and smooth to a high level. Because the high flatness of the magnetic recording medium surface is required in order to minimize the flying height of the magnetic head and to solve the problem of thermal asperity when the MR head (magneto-resistive head) is used. The thermal asperity is a phenomenon in which when there is a protrusion on the surface of the magnetic disk, the MR head is influenced by the protrusion to generate heat in the MR head, the resistivity of the head fluctuates by this heat and malfunction is caused in electromagnetic conversion.

Moreover, even when the magnetic disk surface is provided with high flatness, the protrusion on the magnetic disk surface as a cause of thermal asperity causes head crash and adversely affects the magnetic disk. It is known that a factor for obstructing the smoothness and flatness of the glass substrate is a particle sticking to the substrate surface in the manufacture process of the chemically reinforced glass.

To solve the above-described problem, various improvements for removing the adverse influence of the particle have been proposed in the manufacture process of the chemically reinforced glass substrate. For a chemical reinforcement treatment as one step of a manufacture process, the present applicant has already proposed a technique of removing iron powder or the like from atmosphere in a chemical reinforcement chamber in which the chemical reinforcement treatment is performed to prevent the iron powder or the like from being mixed into a chemical reinforcement liquid (Japanese Patent Application Laid-Open No. 194785/1998). Moreover, a technique of filtering the chemical reinforcement liquid with filters superor in high-temperature corrosion resistance, such as micro-sieve (metal net with a hole made by etching) to remove the iron powder or the like mixed into the chemical reinforcement liquid from the atmosphere in the chemical reinforcement chamber has already been developed and proposed (Japanese Patent Application Laid-Open No. 194786/1998).

However, for the above-described conventional technique of removing the mixed impurity in the process of chemical reinforcement, when the cleanliness of an initially introduced chemically reinforcing molten salt itself is unsatisfactory, there is a limitation in enhancement of the cleanliness of the glass substrate surface.

Moreover, for the conventional technique of removing the particles of the chemically reinforcing molten salt with the filter of the chemical reinforcement tank, since all the chemically reinforcing molten salts are not necessarily filtered, It is also difficult to avoid the residual particles in the chemically reinforcing molten salt.

By environmental changes such as the high specification of information processing hardware and the importance of high reliability necessary for use n a server or the like, the problem cannot be ignored.

To solve the problem, the present inventor et al. have noted a process of manufacturing a chemically reinforcing molten salt from a powder raw material, which has been disregarded.

Since the reinforcement ability of the chemically reinforcing molten salt Is deteriorated through processes, for the chemically reinforced glass substrates for mass production such as a magnetic disk glass substrate, the frequency of replacement of the chemically reinforcing molten salt increases as compared with other products. For the conventional replacement of the chemically reinforcing molten salt, a method usually comprises discharging the chemically reinforcing molten salt with the deteriorated chemical reinforcement ability from the chemical reinforcement tank, and dissolving a new powder raw material to store the chemically reinforcing molten salt. The present inventor et al. have found that during introduction of the raw material into the chemical reinforcement tank, the powder raw material is scattered in the atmosphere, and the impurity in the scattered raw material adheres to the surface of the chemically reinforced glass.

SUMMARY OF THE INVENTION

The present invention has been developed under such background, and an object thereof is to prevent an impurity mixed in a raw material from sticking to a chemically reinforced class substrate in initial introduction of a chemically reinforcing molten salt.

Another object of the present invention is to prevent the generated impurity in a raw material from sticking to the chemically reinforced glass during replacement of the chemically reinforcing molten salt accompanying mass production.

Still another object of the present invention is to prevent the impurity fin the raw material generated during manufacture of he chemically reinforcing molten salt from the raw material from sticking to a glass substrate for an information recording medium.

Further object of the present invention is to provide a manufacture method of a glass substrate for an information recording medium in which a protrusion formed by micro iron powder sticking to the glass substrate can effectively be reduced in a chemical reinforcement process.

Still further object of the present invention is to provide a manufacture method in which particles sticking to the information recording medium glass substrate and adversely affecting the information recording medium can effectively be inhibited from sticking in the chemical reinforcement process, and a high-quality information recording medium with little defect can be manufactured.

Another object of the present invention is to provide a manufacture method of a magnetic disk which can prevent low flying height, head crash, and thermal asperity.

In the present invention, it has been found that during manufacture of a chemically reinforcing molten salt by dissolving a raw material, a generated impurity is a factor in obstruction of high quality on the surface of a chemically reinforced glass, and an important idea is to remove the impurity.

Specifically, the present invention is constituted as follows:

According to a first aspect of the present invention there is provided a manufacture method of a chemically reinforced glass for placing a glass substrate in contact with a chemically reinforcing molten salt contained in a chemical reinforcement tank to perform chemical reinforcement, the method comprising steps of: dissolving a raw material in a dissolution tank to obtain the chemically reinforcing molten salt; transferring the dissolved chemically reinforcing molten salt to a chemical reinforcement tank; and placing the glass substrate in contact with the chemically reinforcing molten salt of the chemical reinforcement tank to perform the chemical treatment.

According to a second aspect of the present invention, in the chemically reinforced glass manufacture method according to the first aspect, the atmosphere of the chemical reinforcement tank is separated from the atmosphere of the dissolution tank.

According to a third aspect of the present invention, in the chemically reinforced glass manufacture method according to the first or second aspect, the chemical reinforcement tank is disposed in a clean room.

According to a fourth aspect of the present invention, in the chemically reinforced glass manufacture method according to any one of the first to third aspects, an impurity is removed in the step of transferring the chemically reinforcing molten salt obtained by dissolving the raw material to the chemical reinforcement tank.

According to a fifth aspect of the present invention, in the chemically reinforced glass manufacture method according to the fourth aspect, the impurity is a metal or an oxide, a nitride, or a carbide of the metal.

According to a sixth aspect of the present invention, in the chemically reinforced glass manufacture method according to the fifth aspect, the metal is Fe, Na, Mg, Si, Cr, Ni, Si, K, Al, or Kr.

According to a seventh aspect of the present invention, in the chemically reinforced glass manufacture method according to the fourth aspect, the impurity is removed by filtering.

According to an eighth aspect of the present invention, in the chemically reinforced glass manufacture method according to the seventh aspect, in the filtering for removing the impurity, a filter of 20 to 1500 meshes is used. The mesh size is more preferably in a range of 100 to 1000. The mesh denotes the number of stitches present in 25.4 mm (1 inch) (JIS K6900). For the filter, a lamination type is preferable.

According to a ninth aspect of the present invention, there is provided a manufacture method of a glass substrate for an information recording medium, comprising a step of manufacturing the grass substrate for the information recording medium using the chemically reinforced glass manufacture method according to any one of the first to eighth aspects.

According to a tenth aspect of the present invention, there is provided a manufacture method of an information recording medium, comprising a step of forming an information recording layer on the information recording medium glass substrate manufactured by the manufacture method of the information recording medium glass substrate according to the ninth aspect.

According to an eleventh aspect of the present invention, there is provided a chemical reinforcement device of a glass substrate for chemically reinforcing a glass substrate surface by ion exchange, the device comprising: a dissolution tank for dissolving a raw material to manufacture a chemically reinforcing molten salt; a chemical reinforcement tank for containing the chemically reinforcing molten salt supplied from the dissolution tank, and subjecting the glass substrate to chemical reinforcement; and transfer means for transferring he chemically reinforcing molten salt to the chemical reinforcement tank from the dissolution tank.

According to a twelfth aspect of the present invention, the chemical reinforcement device according to the eleventh aspect further comprises removal means for removing an impurity from the chemically reinforcing molten salt in a process of transferring the chemically reinforcing molten salt prepared by dissolving the raw material to the chemical reinforcement tank. The removal means is preferably disposed on at least one conveyance means for conveying the chemically reinforcing molten salt between the dissolution tank and the chemical reinforcement tank.

According to a thirteenth aspect of the present invention, the chemical reinforcement device according to the twelfth aspect further comprises conveyance means for conveying the dissolved chemically reinforcing molten salt to the chemical reinforcement tank from the dissolution tank. When a surface layer, a middle layer, and a precipitate layer are separated/formed after the dissolution of the chemically reinforcing molten salt, the removal means comprises inserting the end of the conveyance means on the side of the dissolution tank into the middle layer.

According to a fourteenth aspect of the present invention, in the chemical reinforcement device according to the eleventh aspect, a holding tank is disposed between the chemical reinforcement tank and the dissolution tank, the holding tank holds the chemically reinforcing molten salt transferred from the dissolution tank, and the held chemically reinforcing molten salt is circulated between the holding tank and the chemical reinforcement tank.

According to a fifteenth aspect of the present invention, in the chemical reinforcement device according to the fourteenth aspect, during the circulation of the chemically reinforcing molten salt between the chemical reinforcement tank and the dissolution tank, the chemically reinforcing molten salt is filtered.

DETAILED DESCRIPTION OF THE PREFERRED EMBODIMENTS

An embodiment of the present invention will be described hereinafter with reference to the drawings. First a chemical reinforcement device, and next a method of using the chemical reinforcement device to chemically reinforce a magnetic recording medium glass substrate will be described. Finally, a method of using the magnetic recording medium glass substrate to manufacture a magnetic recording medium will be described.

Figure 1:
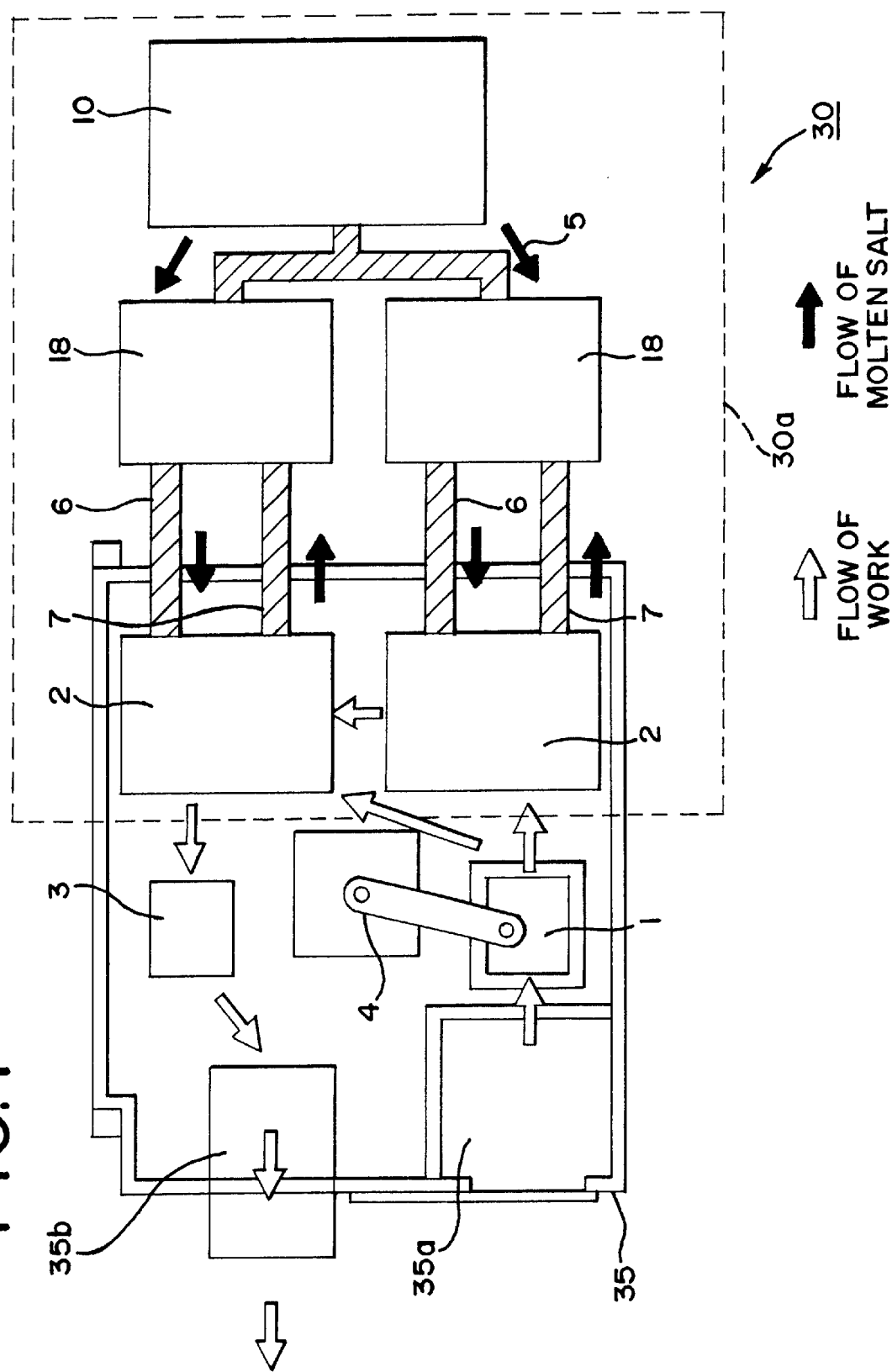
FIG. 1 is a schematic plan view of a chemical reinforcement device of the present invention.
Figure 2:
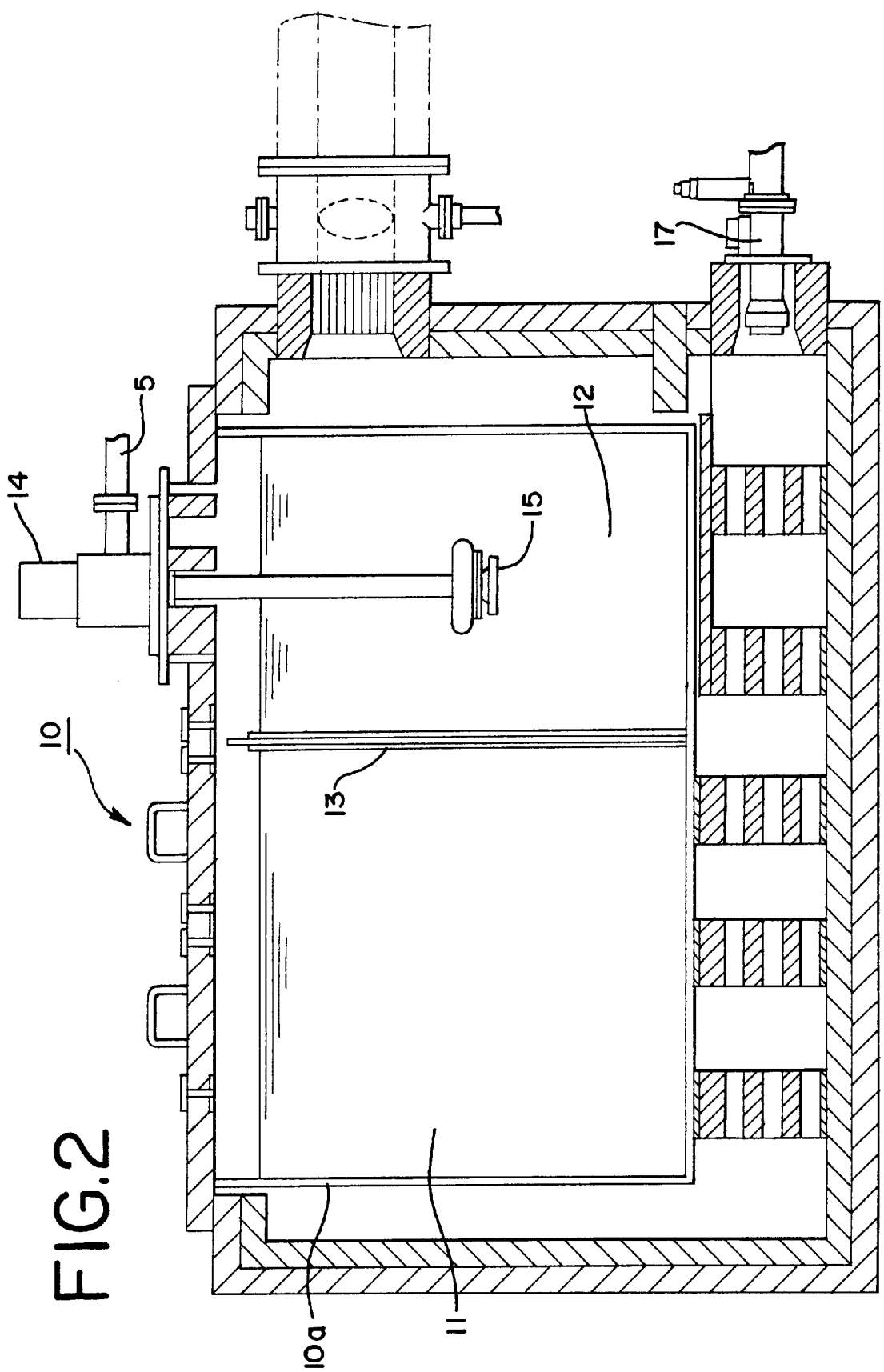
FIG. 2 is a sectional view of a dissolution tank of the present invention.
Figure 3:
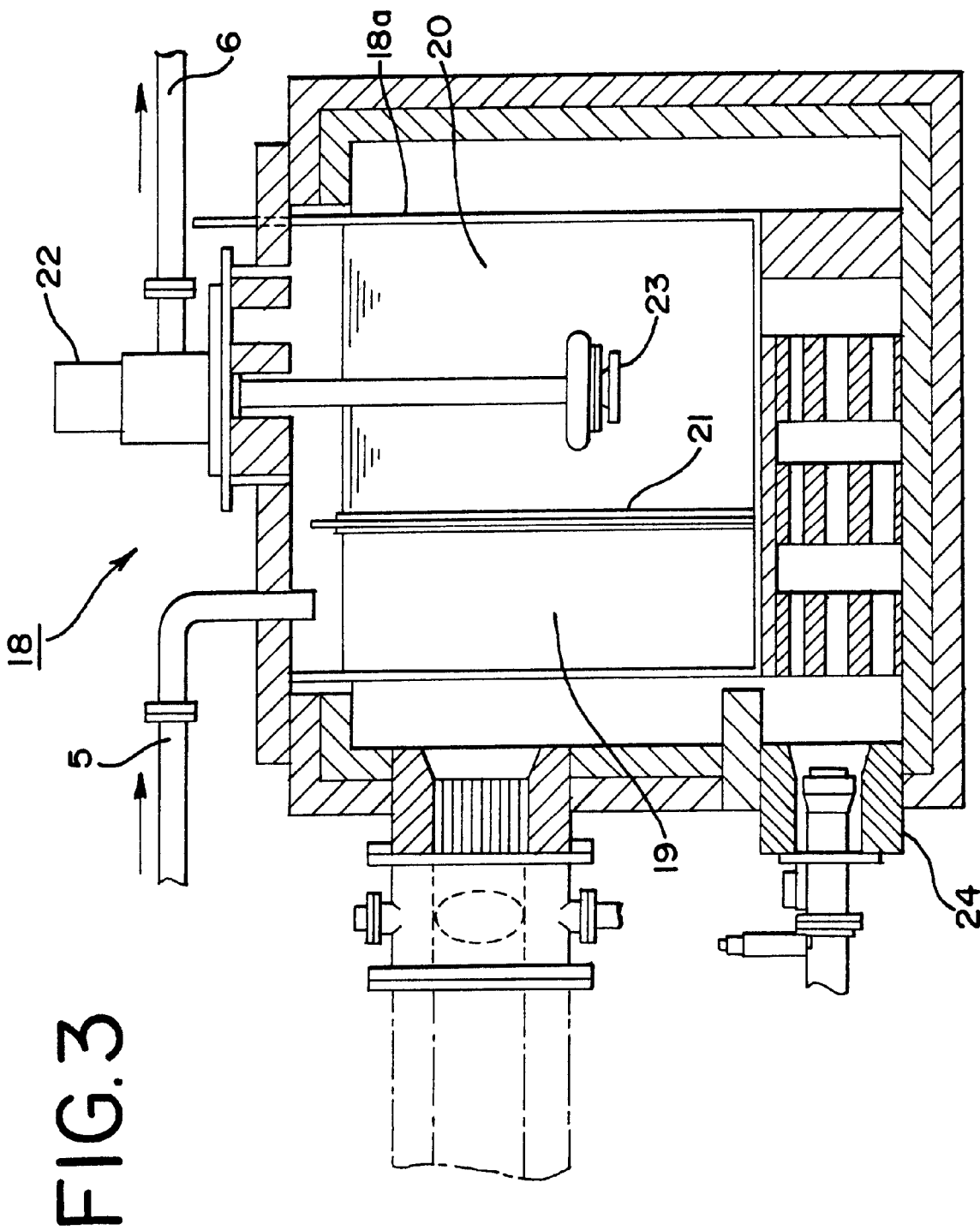
FIG. 3 is a sectional view of a holding tank of the present invention.

FIG. 1 is an entire constitution diagram of a chemical reinforcement system, FIG. 2 is a sectional view of a dissolution tank for dissolving a raw material of a chemically reinforcing molten salt, and FIG. 3 is a sectional view of a holding tank for once holding the chemically reinforcing molten salt before supplying the salt to the chemical reinforcement tank. (Chemical Reinforcement System)

A chemical reinforcement system 30 of the present embodiment is, as shown in FIG. 1, constituted mainly of a device disposed in a clean room 35, holding tanks 18, 18' disposed outside the clean room 35, and a dissolution tank 10 for dissolving a chemically reinforcing molten salt.

In the clean room 35, a work introducing unit 35a, a preheating tank 1 for preheathng a substrate as a preprocess of chemical reinforcement, chemical reinforcement tanks 2, 2' for subjecting a glass substrate to chemical reinforcement, an annealing tank 3 for slow-cooling heat of the treated glass substrate, and a work extracting unit 35b are arranged in order of process.

A chemical reinforcement device 30a of the present embodiment is provided with the dissolution tank 10, holding tank 18, chemical reinforcement tank 2, 2', and pipes 5, 6, 7, and the chemical reinforcement tank 2, 2' is disposed in the clean room 35.

In the chemical reinforcement device 30a of the present embodiment, the chemical reinforcement tank 2, 2' for performing the chemical reinforcement and the dissolution tank 10 are separated by the clean room 35. The separation of both in this manner prevents the powder raw material of the chemically reinforcing molten salt from being mixed in the glass substrate operation atmosphere for []performing the chemical reinforcement. In addition to the separation, the chemical reinforcement tank 2, 2' is disposed in the clean room 35, so that particles can be prevented from sticking to the glass substrate to a high level during the chemical reinforcement.

From when the glass substrate is introduced to the work introducing unit 35a of the clean room 35 until the glass substrate (work) is conveyed from the work extracting unit 35b, the glass substrate is successively conveyed by a conveyance robot 4. The conveyance robot 4 is provided with a function of grasping a glass substrate cassette with a robot arm, transferring the glass substrate cassette to the respective device tanks, lowering the glass substrate cassette to apply various treatments, and raising the glass substrate cassette after the treatments.

In this embodiment, the two chemical reinforcement tanks are disposed. In order to increase a production, while the glass substrate cassette is immersed in the chemical reinforcement tank 2, the other glass substrate cassette may be prepared in the preheating tank, and it may be immersed in the chemical reinforcement tank 2'. Alternatively, in order to carry cut the chemical reinforcement treatment separately twice, the glass substrate cassette may be transferred from the chemical reinforcement tank 2' to the chemical reinforcement tank 2.

The dissolution tank 10 disposed outside the clean room 35 is a tank for dissolving the raw material of the chemically reinforcing molten salt, as shown in the sectional view of FIG. 2, an inner tank 1 divided into a first tank 11 for containing and dissolving the raw material, and a second tank 12 for containing the dissolved chemically reinforcing molten salt flowing from the first tank 11, and a lamination type filter 13 is disposed between the tanks. The filter 13 is a 300-mesh filter. By the filter 13, particles of metal, metal oxide, metal nitride, metal carbide, and the like can be removed from the chemically reinforcing molten salt in a fluid state obtained by melting the powder raw material.

Moreover, a pump 14 is disposed on the upper end surface of the second tank 12, and the pump 14 is connected to a pipe 5 for conveying the chemically reinforcing molten salt stored in the second tank 12 to the holding tank 18. An opening 15 of the pipe 5 is disposed 50 cm below the surface of the chemically reinforcing molten salt. The opening 15 is about 50 cm below the liquid surface in this manner for the following reason.

For the chemically reinforcing molten salt, convection is generated by heating, and impurities float up in the vicinity of the liquid surface (surface layer) of the chemically reinforcing molten salt in some cases. The impurities are mainly composed of organic materials such as C, O, Mg, Al, Si, Cl, Fe, etc which generate harshness. Moreover, when the chemically reinforcing molten salt is cooled after heating, the impurities are sometimes precipitated in the bottom (precipitate layer) of the molten salt. The impurities are mainly composed of inorganic materials. Therefore, in order not to feed these impurities to the chemical reinforcement tank 2, 2', the opening 15 is disposed below the liquid surface as described above 9 (a position on an intermediate layer of the chemically reinforcing molten salt).

Moreover, a filter (not shown) is disposed in the opening 15, and realizes the removal of particles in cooperation with the filter 13.

Furthermore, heating means (gas burner) 17 for dissolving the raw material and maintaining the state of the molten salt is disposed on the bottom of the dissolution tank 10.

The holding tank 18, 18' is provided with two functions of: accumulating the chemically reinforcing molten salt manufactured by the dissolution tank 10, cleaning the salt, and supplying the salt to the chemical reinforcement tank 2, 2'; and collecting the chemically reinforcing molten salt used in the chemical reinforcement tank 2, 2' for a predetermined time, removing the impurities, and again supplying the salt to the chemical reinforcement tank 2, 2'.

As shown in FIG. 3, the structure of the holding tank 18, 18' is vertically divided into a third tank 19, and a fourth tank 20. The third tank 19 contains the chemically reinforcing molten salt transferred via the pipe 5 from the dissolution tank 10. Moreover, the chemically reinforcing molten salt contained in the third tank is accumulated in the fourth tank 20 via a filter 21.

Moreover, a pump 22 is disposed on the upper end of the holding tank 18, 18' on the right side. Furthermore, the pump 22 is connected to the pipe 6 for conveying the chemically reinforcing molten salt to the chemical reinforcement tank 2, 2' from the holding tank 18, 18'. Additionally, a heating burner 24 is disposed on the bottom of the holding tank 18, 18' to maintain the temperature of the chemically reinforcing molten salt.

Furthermore, by operating the pump 14, the chemically reinforcing molten salt manufactured by the dissolution tank 10 is transferred to the holding tank 18, 18' via the pipe 5.

Additionally, by operating the pump 22, the chemically reinforcing molten salt accumulated in the holding tank 18, 18' is transferred to the chemical reinforcement tank 2, 2' via the pipe 6, and the used chemically reinforcing molten salt is collected to the holding tank 18, 18' from the chemical reinforcement tank 2, 2' via the pipe 7.

(Manufacture Method of Chemically Reinforced Glass)

A method of using the chemical reinforcement device to chemically reinforce the glass substrate will be described.

The glass substrate to be chemically reinforced is a glass substrate for a magnetic disk.

Prior to the chemical reinforcement of the glass substrate, the chemically reinforcing molten salt is first manufactured. Potassium nitrate and sodium nitrate as raw materials are introduced to the first tank 11 of the dissolution tank 10, and heated at 380 to 400° C. for 12 hours by the heating means 17. When a fluid state is obtained, the chemically reinforcing molten salt flows to the second tank 12 from the first tank 11.

After the manufacture of the chemically reinforcing molten salt is completed, the pump 14 of the dissolution tank 10 is operated to once transfer he chemically reinforcing molten salt to the holding tank 18, 18' from the dissolution tank 10.

The chemically reinforcing molten salt transferred from the dissolution tank 10 is contained in the third tank 19 of the holding tank 18, 18' and accumulated in the fourth tank 20 via the filter 21.

Subsequently, the chemically reinforcing molten salt accumulated in the fourth tank 20 of the holding tank 18, 18' is transferred to the chemical reinforcement tank 2, 2' by operating the pump 22, and heated to 380 to 400° C. This completes the preparation of the chemically reinforcing molten salt.

When the chemically reinforcing molten salt of the chemical reinforcement tank is contained, and the inside of the clean room is set to class 10000, the glass substrate starts to be chemically reinforced.

The glass substrate is obtained by dissolving aluminosilicate glass as the raw material able to be chemically reinforced, and the dissolved glass is molded in a plate shape by a float method to form a sheet glass. Additionally, used as aluminosilicate glass is a chemical reinforcement glass containing, in terms of mol %, 57 to 74% of $SiO_2$: 0 to 2.8% of $ZrO_2$, 3 to 15% of $Al_2O_3$, 7 to 16% of $LiO_2$, and 4 to 14% of $Na_2O$ as main components (e.g., a chemical reinforcement glass containing, in terms of mol %, $SiO_2$: 67.0%, $ZrO_2$: 1.0%, $Al_2O_3$: 9.0%, $LiO_2$: 12.0%, and $Na_2O$: 10.0% as main components).

The glass substrate is cut from the sheet glass obtained as described above in a disc shape, the end surface is then polished, the surface and back surfaces are successively subjected to lapping and polishing, and mirror surfaces are processed.

Subsequently, the polished class substrate is successively immersed and cleaned in cleaning tanks of neutral detergent, neutral detergent, pure water, pure water, isopropyl alcohol (IPA), and IPA (steam drying).

For the disc-shaped glass substrate obtained in this manner, only the side surface of the outer peripheral part is held with three-point contact, and one set consisting of 25 substrates (a plurality of glass substrates in this state will be referred to as the glass substrate set) is mounted on a holder formed of a stainless alloy provided with resistance at a chemical reinforcement temperature. Subsequently, this glass substrate set is intermittently introduced into the clean room 35.

The glass substrate set introduced to the work introducing unit of the clean room 35 is conveyed to the preheating tank 1 by the conveyance means 4. The set is heated to 150° C. in the preheating tank 1.

Subsequently, the preheated glass substrate set is conveyed onto the chemical reinforcement tank 2, and immersed at 380 to 400° C. for 4 hours in he chemically reinforcing molten salt. By the immersion treatment in the chemical reinforcement liquid, lithium ion, and sodium ion on a glass substrate surface layer are replaced with sodium ion, and potassium ion of the chemically reinforcing molten salt, respectively, so that the glass substrate is reinforced.

During the chemical reinforcement treatment in the chemical reinforcement tank 2, the other glass substrate is prepared in the preheating tank, and during the chemical reinforcement treatment in the chemical reinforcement tank 2, or after the chemical reinforcement treatment, it is immersed in the chemical reinforcement tank 2' to carry out the chemical reinforcement of the class substrate.

The thickness of a compression stress layer formed on the glass substrate surface layer is about 100 to 200 $\mu$m.

The completely chemically reinforced glass substrate set is lifted up from the chemically reinforcing molten salt, and conveyed to the annealing tank 3. The glass substrate set is held in the annealing tank 3 at 200° C. for one hour, and gradually cooled.

The completely annealed glass substrate set is finally conveyed to the work extracting unit 35b, and conveyed from the clean room to complete a series of chemical reinforcement. Thereafter, the glass substrate set is cleaned, and the contamination of the glass substrate surface by the chemically reinforcing molten salt is removed.

The surface roughness Ra of the glass substrate obtained through the above-described processes is in a range of 0.5 to 1 nm.

Subsequently, the glass substrate surface of the present embodiment was evaluated by a scanning type electron microscope, or X-ray analysis, and no foreign matters sticking to the surface, such as Fe and Cr could not be confirmed.

Moreover, in the observation of the glass surface by an optical microscope, the protrusion as a cause of thermal asperity or head crash was not found. (Manufacture Method of Magnetic Disk)

A method of using the magnetic disk glass substrate manufactured in the chemical reinforcement manufacture process to manufacture a magnetic disk will be described hereinafter.

An underlying layer, a magnetic layer, a protective layer by a scattering method, and a lubricant layer by a dip method are successively formed on the chemically reinforced glass substrate.

The underlying layer is formed of Cr and CrMo (Cr: 94 at %, Mo: 6 at %) (thickness of 25 nm), the magnetic layer is of CoPtCrTa (Co: 75 at %, Cr: 17 at %, Pt: 5 at %, Ta: 3 at %) (thickness of 27 nm), the protective layer is a hydrocarbon film (thickness of 7 nm), and the lubricant layer is of perfluoropolyether (thickness of 1 nm).

When the obtained magnetic disk was subjected to a glide test (glide height: 1.2 microinches, peripheral speed: 8 m/s) (1300 disks), neither hit (hitting of the head against the protrusion on the magnetic disk surface) nor crash (collision of the head against the protrusion on the magnetic disk surface) could be found. Moreover, it was confirmed that no defect was generated on the films such as the magnetic layer by the particles as the cause of thermal asperity.

Moreover, the magnetic disk of the present embodiment subjected to the glide test was subjected to the regeneration test with a magnetoresistive head, but for all of a plurality of samples (400 disks), no regeneration malfunction by thermal asperity was seen.

The preferred embodiment of the present invention has been described above, but the present invention is not limited to the above embodiment.

For example, the present invention can be applied even to other information recording medium glass substrates manufactured through the chemical reinforcement process. Examples include an optical disk glass substrate, an optical magnetic disk glass substrate, and various information recording medium glass substrates.

Moreover, in addition to the Information recording medium, the present invention can be applied to a chemically reinforced glass for use in a device whose optical or electric function is deteriorated by the influence of particles.

Furthermore, in the above-described embodiment, the dissolution tank is separated so that the particles resulting in dust in the dissolution tank are prevented from being mixed in the preheating after polishing, the chemical reinforcement, and the annealing process, but this is not limited. When the dissolution tank is separated from any one of the respective processes from the cleaning process after polishing to the packaging and shipping of the glass substrate, a practical effect can be obtained. After the polishing, all the processes of cleaning, preheating, chemical reinforcement, annealing, cleaning, and packaging are separated from the dissolution tank, and the effect therefore becomes remarkable.

In the present invention, when the dissolution tank is separated from the chemical reinforcement tank, the effect is produced, but when the filter is also used, the effect is enhanced. The filter mesh size may appropriately be selected in accordance with the type of the particles to be removed.

In the above-described embodiment, the two holding tanks and the two chemical reinforcement tanks are disposed, but this constitution is not limited. The one holding tank and the one chemical reinforcement tank may be disposed. Alternatively, the three holding tanks and the three chemical reinforcement tanks may be disposed. Moreover, the dissolution tanks may be disposed corresponding to the number of the holding tanks.

In the above-described embodiment, to enhance the effect, the holding tank is disposed between the dissolution tank and the chemical reinforcement tank, but the holding tank s not necessarily required.

In the above-described embodiment, to enhance the effect, the inner structures of the dissolution tank and chemical reinforcement tank are partitioned with the filters, but the partition is not necessarily required.

As the glass type of the glass substrate, in addition to the glass substrate of the embodiment, a soda-lime glass, a borosilicate glass, and a lead glass can be used.

The cleanliness of the clean room is set to class 10000, more preferably to class 1000 or less.

Moreover, by disposing the cleaning tank in the clean room, the glass substrate may be cleaned before or after the chemical reinforcement in the clean room.

As the chemically reinforcing molten salt, in addition to the above-described embodiment, $Na_2SO_4$, $K_2SO_4$, NaBr, IKBr can be used. Moreover, the chemical reinforcement may be performed on a part, instead of the entire.

Moreover, in the above-described embodiment, by introducing a dummy glass substrate into the chemical reinforcement tank containing the chemically reinforcing molten salt, treating the substrate on the same condition as that of the chemical reinforcement before the chemical reinforcement, and attaching the particles present in the chemical reinforcement tank to the glass substrate, the cleanliness of the chemically reinforcing molten salt during the chemical reinforcement can further preferably be enhanced.

For the method of separating the atmosphere of the chemical reinforcement tank 2 from the atmosphere of the dissolution tank 10, instead of disposing he chemical reinforcement tank 2, 2' in the clean room 35 as in the above-described embodiment, both atmospheres may be separated simply by a partition wall. Moreover, instead of using a physical shield, there are a method of preparing a wall by air current, a method of remotely separating both tanks, and the like, so that both atmospheres are prevented from being mixed.

As described above, according to the present invention, since the particles generated during the manufacture of the chemically reinforcing molten salt can be controlled, the chemically reinforced glass with a high surface cleanliness can be manufactured.

Moreover, when the information recording medium glass substrate is manufactured according to the present invention, the particles as the cause of the recording/regenerating malfunction can be prevented from sticking to the glass substrate surface in the chemical reinforcement process.

Furthermore, the present invention can provide the magnetic disk which can prevent low flying height, head crash, and regenerating function deterioration by thermal asperity. Additionally, the low flying height of 1.2 microinches or less can be realized.

What is claimed is:

1. A manufacture method of a chemically reinforced glass substrate for a magnetic recording medium by placing a glass substrate in contact with a chemically reinforcing molten salt contained in a chemical reinforcement tank to perform chemical reinforcement, preventing particles which cause a recording or regenerating malfunction due to a head crash or a thermal asperity from sticking to the glass substrate, said method comprising the steps of: separating the atmosphere of the chemical reinforcement tank from the atmosphere of a dissolution tank for dissolving a raw material of the chemically reinforcing molten salt in a manner to prevent a powder raw material of the chemically reinforcing molten salt from being mixed in a glass substrate operation atmosphere for performing the chemical reinforcement; dissolving the raw material in the dissolution tank to obtain the chemically reinforcing molten salt; transferring the dissolved chemically reinforcing molten salt to the chemical reinforcement tank; and placing the glass substrate in contact with the chemically reinforcing molten salt of the chemical reinforcement tank to perform the chemical reinforcement so that impurities that may be mixed in the raw material in the initial introduction of the chemically reinforcing molten salt or generated in the raw material during replacement of the chemically reinforcing molten salt are prevented from sticking to the chemically reinforced glass substrate.

2. The chemically reinforced glass manufacture method according to claim 1 wherein an impurity is removed in the step of transferring the chemically reinforcing molten salt obtained by dissolving the raw material to the chemical reinforcement tank.

3. The chemically reinforced glass manufacture method according to claim 2 wherein the impurity is a metal or an oxide, a nitride, or a carbide of the metal.

4. The chemically reinforced glass manufacture method according to claim 3 wherein the metal is Fe, Na, Mg, Si, Cr, Ni, Si, K, Al, or Kr.

5. The chemically reinforced glass manufacture method according to claim 2 wherein the impurely is removed by filtering.

6. The chemically reinforced glass manufacture method according to claim 5 wherein in the filtering for removing the impurity, a filter of 20 to 1500 meshes is used.

7. A manufacture method of a glass substrate for an information recording medium, comprising a step of manufacturing the glass substrate for the information recording medium using the chemically reinforced glass manufacture method according to claim 1.

8. A manufacture method of an information recording medium, comprising a step of forming an information recording layer on the information recording medium glass substrate manufactured by the manufacture method of the information recording medium glass substrate according to claim 7.

9. The chemically reinforced glass manufacture method according to claim 1 wherein the chemical reinforcement tank is disposed in a clean room.

10. The chemically reinforced glass manufacture method according to claim 1 wherein an impurity is removed in the step of transferring the chemically reinforcing molten salt obtained by dissolving the raw material in the dissolution tank to the chemical reinforcement tank.

11. The chemically reinforced glass manufacture method according to claim 10 wherein the impurity is a metal or an oxide, a nitride, or a carbide of the metal.

12. The chemically reinforced glass manufacture method according to claim 11 wherein the metal is Fe, Na, Mg, Si, Cr, Ni, Si, K, Al, or Kr.

13. The chemically reinforced glass manufacture method according to claim 10 wherein the chemically reinforcing molten salt obtained by dissolving the raw material in the dissolution tank is transferred to the chemical reinforcement tank via a pipe.

14. The chemically reinforced glass manufacture method according to claim 10 wherein the impurity is removed by filtering.

15. The chemically reinforced glass manufacture method according to claim 14 wherein the filtering for removing the impurity, a filter of 20 to 1500 meshes is used.

16. A manufacture method of an information recording medium, comprising a step of forming an information recording layer on the information recording medium glass substrate manufactured by the manufacture method of the information recording medium glass substrate according to claim 1.

17. A manufacture method of an information recording medium, an information recording layer is formed on the glass substrate for the information recording medium manufactured by using the manufacture method of the glass substrate for the information recording medium according to claim 1.

18. A manufacture method of a magnetic recording medium, a magnetic layer is formed on the glass substrate for the information recording medium manufactured by using the manufacture method of the glass substrate for the information recording medium according to claim 1.

* * * * *